United States Patent [19]

Marcus

[11] 4,275,913
[45] Jun. 30, 1981

[54] VEHICLE STORAGE RECEPTACLE
[75] Inventor: Konrad H. Marcus, Holland, Mich.
[73] Assignee: Prince Corporation, Holland, Mich.
[21] Appl. No.: 31,550
[22] Filed: Apr. 19, 1979
[51] Int. Cl.³ .............................................. B60R 7/08
[52] U.S. Cl. .................................. 296/37.1; 296/97 C
[58] Field of Search .................. 296/37.1, 37.7, 37.8, 296/97 C, 97 H, 97 F, 97 G, 97 K, 97 R; 180/90

[56] References Cited
U.S. PATENT DOCUMENTS

| | | | |
|---|---|---|---|
| 1,885,594 | 11/1932 | Drury | 296/97 C |
| 2,163,495 | 6/1939 | Levy | 296/97 C |
| 2,395,592 | 2/1946 | Tierney | 296/97 C X |
| 2,547,101 | 4/1951 | Uttz | 296/97.13 X |

*Primary Examiner*—Randolph A. Reese
*Assistant Examiner*—Norman L. Stack, Jr.
*Attorney, Agent, or Firm*—Price, Heneveld, Huizenga & Cooper

[57] ABSTRACT

A storage receptacle for a vehicle stores eyeglasses or like size objects against the headliner of the vehicle. A mounting member pivotally attaches the storage receptacle to the headliner and also serves to detachably support the end posts of the vehicle's sun visors.

10 Claims, 4 Drawing Figures

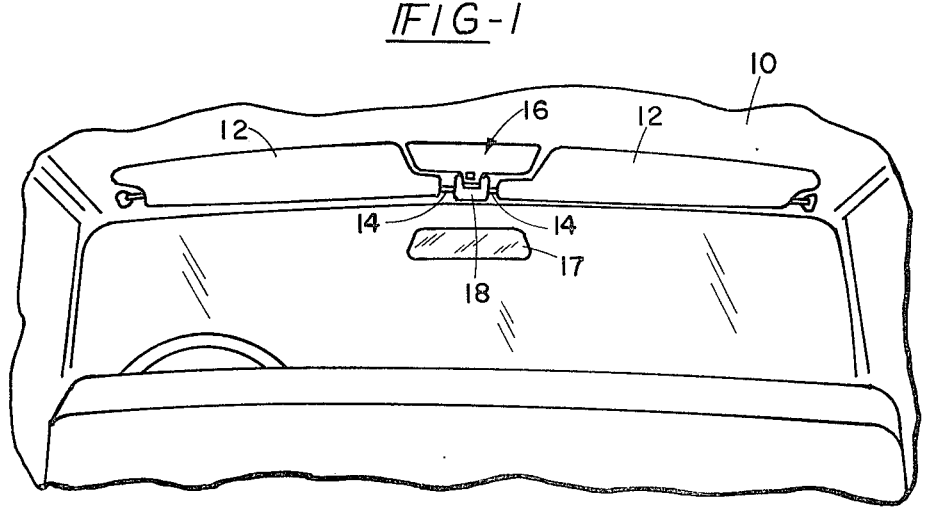
FIG-1
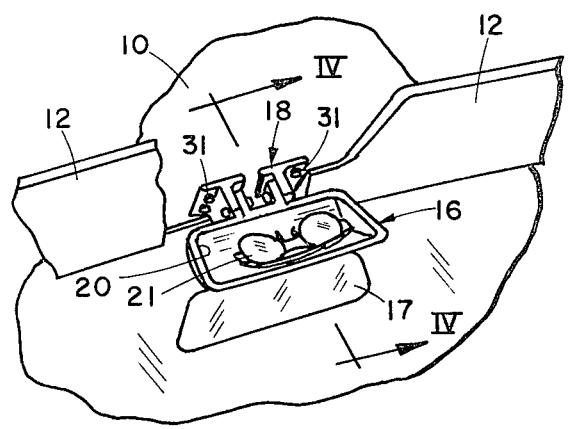
FIG-2
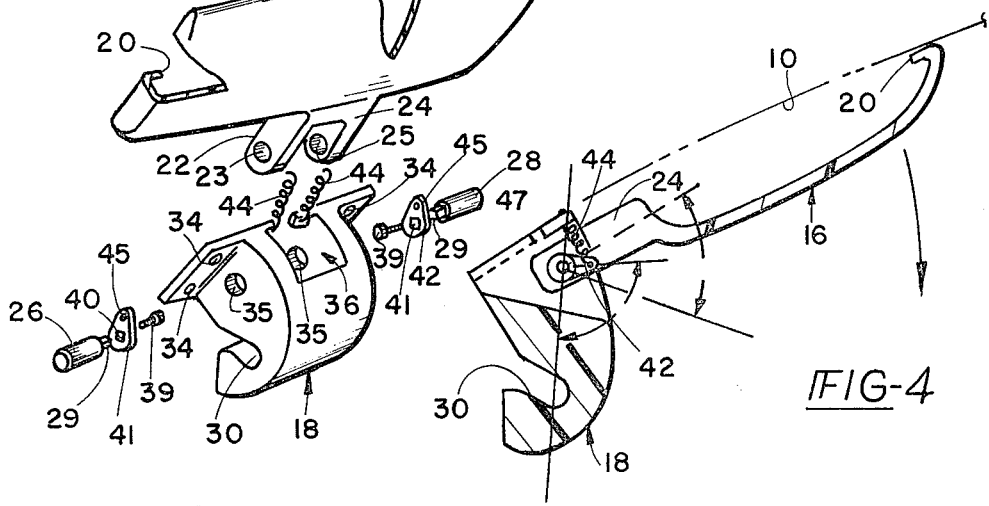
FIG-3
FIG-4

VEHICLE STORAGE RECEPTACLE

BACKGROUND OF THE INVENTION

This invention relates to storage receptacles for vehicles for the storage of eyeglasses or like size objects against the vehicle's headliner.

The storage of eyeglasses or like size objects which the driver of a car wishes to have readily accessible has been difficult in the past, as the only available storage means have been the vehicle glove compartment or add on devices which are strapped to the vehicle sun visors. Such devices can be bulky and pose a safety hazard to the vehicle operator in the event of an accident since if attached to the visor, they are located at the head level of the vehicle. Also, they detract from the appearance of the vehicle interior and are frequently inconvenient to use. The vehicle operator, thus, frequently resorts to setting such objects on the dashboard where they are unprotected and easily broken.

SUMMARY OF THE INVENTION

It is an object of the present invention to provide a storage receptacle for eyeglasses or like objects which is readily accessible to the driver or occupant of the vehicle.

Another object of the invention is to provide a storage receptacle which occupies unused space in the vehicle.

Still another object of the invention is to provide a storage receptacle which may be mounted to the vehicle interior on a mounting member which also serves to releasably clamp the end posts of the vehicle sun visors.

Still another object of the invention is to provide a storage receptacle which uses the vehicle headliner as part of a storage compartment.

Apparatus embodying the present invention include a dish-shaped receptacle which conforms generally to the vehicle headliner in the area between the vehicle sun visors. The receptacle is pivotally mounted to a mounting member positioned on the vehicle headliner between the vehicle sun visors.

In the preferred embodiment, the mounting member also serves to releasably clamp the end posts of the vehicle sun visor. With such an arrangement, the opening and closing of the storage receptacle can be easily carried out with only one hand and requires little or no visual attention from the operator.

These and other objects, features, and advantages of the present invention will become apparent upon reading the following description thereof, together with reference to the following drawings in which:

BRIEF DESCRIPTION OF THE DRAWINGS

FIG. 1 is a view of the storage receptacle embodying the present invention shown in its closed position against the vehicle headliner between the vehicle sun visors;

FIG 2 is a perspective view from above the storage receptacle when in an open position accessible to the vehicle operator;

FIG. 3 is an enlarged exploded view partly broken away of the storage receptacle and mounting member showing the various structural components; and FIG. 4 is a cross-sectional side view of the storage compartment in its closed position.

DETAILED DESCRIPTION OF THE PREFERRED EMBODIMENT

Referring to the Figs., the interior of the vehicle has a headliner designated generally at 10 and a pair of sun visors 12, each of which visors has free inner end posts 14. A storage receptacle 16 is pivotally supported relative to the vehicle headliner 10 above rearview mirror 17 by a mounting bracket 18. The receptacle 16 is concave and dish-shaped including an inwardly formed edge 20 defining the perimeter of the receptacle to engage and conform to the shape of the vehicle headliner 10 when the receptacle 16 is in its closed position. Edge 20 also serves to prevent objects such as glasses 21 from inadvertently sliding from the receptacle when it is being opened. Receptacle 16 integrally includes a pair of legs 22 and 24 extending outwardly from the lower edge of the receptacle as best seen in FIG. 3. Apertures 23 and 25 extend tranversely through legs 22 and 24, respectively, for receiving pivot pins 26 and 28 pivotally mounting receptacle 16 to bracket 18.

The bracket or mounting member 18 contains recesses 30 at opposite sides to releasably receive end posts 14 at the inner ends of the vehicle sun visors 12. The mounting member 18 has a plurality of holes 32 which allow it to be mounted to the vehicle headliner by screws or bolts 31 (FIG. 2). The mounting member thus takes the place of the usual member which serves to clamp the end posts of the vehicle sun visors in standard automobiles. Member 18 includes a central recess 36 for receiving legs 22 and 24. Aligned bores 35 are formed at each side of member 18 into recess 36.

The dowel-shaped pins 26 and 28 are of a length sufficient to extend into recess 36 of the mounting member 18 and through the legs 22 and 24. The adjacent inner ends of pins 26 and 28 include a square projection 29 to receive a complementary-shaped square opening 41 in crank arms 40 and 42 fastened to the end of the pins by screws 39. A tension spring 44 is connected to an aperture 45 at one end of each of arms 40 and 42. The other end of each spring 44 is anchored to aperture 47 in member 18 as seen in FIG. 4. Pins 26 and 28 are mounted rigidly in the apertures 23 and 25 of receptacle 16 so that they act as hinge pins and rotate in the apertures 35 of member 18 when the receptacle 16 is pivoted up and down. This rigid attachment may be made by means of an adhesive, a press fit, or some other means.

As best seen in FIG. 4, bias means comprising springs 44 act on the legs 22 and 24 to resiliently maintain the receptacle 16 against the headliner 10. On the other hand, when the receptacle 16 is moved to its open position, the springs 44 pass over the center of the axis of rotation of pins 26 and 28 and serve to maintain the receptacle 16 in its fully open position.

The inside of the receptacle 16 can be lined with a selection of material and fabrics and the outside of the receptacle can be padded and covered with a decorative material to match the vehicle sun visors.

In operation, the receptacle or compartment 16 can be moved up and down between its closed position and an open position giving access to the interior of the compartment. During such movement, the bias means serve to maintain the compartment in either of its selected positions. Moreover, member 18, by which the receptacle is pivotally mounted to the headliner, forms a support for the ends 14 of the usual sun visors mounted in the vehicle.

The receptacle 16 as well as mounting bracket 18 can be injection molded of a polymeric material such as polycarbonate or ABS which is suitable for use in a vehicle interior and can withstand the use and temperature ranges to which vehicle interiors are exposed. Naturally, the pair of pivot pins can be replaced with a single axle and tension springs 44 likewise can be replaced with a single spring and crank arm to achieve the controlled positioning of the receptacle between closed and open positions. As seen in FIGS. 1 and 4, the surface of headliner 10 serves as one of the closure sidewalls of the enclosed compartment defined by the headliner 10 and receptacle 16 when in a closed position. When moved to the open position, the tray is inclined downwardly slightly, providing ready access to the contents.

It will become apparent to those skilled in the art that these and various other modifications to the preferred embodiment of the invention described and disclosed herein can be made without departing from the spirit or scope thereof as defined by the appended claims.

The embodiments of the invention in which an exclusive property or privilege is claimed are defined as follows:

1. A storage receptacle for a vehicle including a pair of sun visors comprising:
    a mounting member adapted to be attached to the vehicle interior above the windshield and centrally between the vehicle's sun visors, a concave receptacle for containing articles pivotally coupled to said mounting member for pivotal movement about an axis between a closed position with the concave side facing the headliner of the vehicle interior whereupon the headliner serves as a closure wall for the receptacle and an open position pivoted downwardly from the headliner for providing access to the contents of said receptacle.

2. The apparatus as defined in claim 1 and further comprising means for retaining said receptacle in a selected open or closed position.

3. The apparatus as defined in claim 2 wherein said means for retaining said receptacle in a selected one of its positions comprises a pivot pin extending between said receptacle and said mounting member and a including a radially extending arm coupled to said pivot pin, biasing means disposed between said radially extending arm and said mounting member, said biasing means being disposed to one side of the axis of said pivot pin when said receptacle is in its open position and to the other side of said axis when said receptacle is in its closed position.

4. The apparatus as defined in claim 3 wherein the pair of sun visors are supported within the vehicle interior at their outboard ends, the sun visors including inboard support posts and wherein said mounting member includes means for releasably receiving the support posts to support the inboard ends of the visors.

5. The apparatus as defined in any of claims 1 through 4 wherein said receptacle includes an inwardly extending peripheral lip for preventing objects from slipping from said receptacle when moved from a closed to an open position.

6. A storage compartment for a vehicle comprising:
    a support member adapted to be mounted to the interior of a vehicle adjacent and above the windshield; and
    a concave receptacle pivotally coupled at one edge to said support member for movement between an open position providing access to the interior of said receptacle and a closed position in which the concave opening of said receptacle engages the headliner of the vehicle for effectively closing the receptacle, and bias means for maintaining said receptacle in a selected one of its open or closed positions and resisting movement to the other of said positions.

7. The apparatus as defined in claim 6 wherein the vehicle has a pair of sun visors at opposite sides of the vehicle and wherein said mounting member is mounted to the vehicle headliner intermediate the sun visors.

8. The apparatus as defined in claim 7 wherein the inboard end of the sun visors have support posts and said mounting member includes means for releasably holding the posts of said visors.

9. The apparatus as defined in claim 6 wherein said receptacle is a rectangular member mounted such that its concavely curved side faces the interior surface of the vehicle, and wherein said receptacle includes an inwardly projecting peripheral lip.

10. The apparatus as defined in claim 9 wherein said receptacle is made of polycarbonate.

* * * * *

UNITED STATES PATENT AND TRADEMARK OFFICE
CERTIFICATE OF CORRECTION

PATENT NO. : 4,275,913
DATED : June 30, 1981
INVENTOR(S) : Konrad H. Marcus

It is certified that error appears in the above—identified patent and that said Letters Patent is hereby corrected as shown below:

Column 3, line 44 (Claim 3):

Delete "a"

*Signed and Sealed this*

*Seventeenth* Day of *November 1981*

[SEAL]

*Attest:*

GERALD J. MOSSINGHOFF

*Attesting Officer* — *Commissioner of Patents and Trademarks*